(12) United States Patent
Shimozato et al.

(10) Patent No.: US 7,798,273 B2
(45) Date of Patent: Sep. 21, 2010

(54) COMPACT VEHICLE

(75) Inventors: Noriya Shimozato, Saitama (JP); Satoru Ikami, Saitama (JP); Kengo Yano, Saitama (JP); Shohei Takiguchi, Saitama (JP); Chikashi Iizuka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 233 days.

(21) Appl. No.: 12/055,143

(22) Filed: Mar. 25, 2008

(65) Prior Publication Data

US 2008/0236926 A1  Oct. 2, 2008

(30) Foreign Application Priority Data

Mar. 27, 2007   (JP) .............................. 2007-081315

(51) Int. Cl.
   *B62K 25/28* (2006.01)
(52) U.S. Cl. ...................... 180/227; 180/309
(58) Field of Classification Search ................. 180/219, 180/227, 309
   See application file for complete search history.

(56) References Cited

U.S. PATENT DOCUMENTS 7,320,378 B2 * 1/2008 Inaoka et al. ............... 180/225
7,422,084 B2 * 9/2008 Mochizuki et al. .......... 180/227

FOREIGN PATENT DOCUMENTS

| EP | 1 524 177 A2 | 4/2005 |
| EP | 1 571 074 A1 | 9/2005 |
| JP | 2-262486 A | 10/1990 |
| JP | 9-249177 A | 9/1997 |
| JP | 2001-97269 A | 4/2001 |
| JP | 3485996 B2 | 10/2003 |

* cited by examiner

*Primary Examiner*—Kevin Hurley
(74) *Attorney, Agent, or Firm*—Birch, Stewart, Kolasch & Birch, LLP

(57) ABSTRACT

To enhance a degree of freedom in the shape and the design of a swing arm without being influenced by the variation of a part for supporting an exhaust muffler on the side of the swing arm and a part for coupling a rear cushion unit to the side of the swing arm in a compact vehicle, a cushion bracket coupled to a lower end of the rear cushion unit and a muffler bracket that supports the exhaust muffler are provided as separate elements from the swing arm and are attached to the swing arm.

16 Claims, 13 Drawing Sheets

COMPACT VEHICLE

CROSS-REFERENCE TO RELATED APPLICATIONS

This nonprovisional application claims priority under 35 U.S.C. §119(a) on Patent Application No. 2007-081315, filed in Japan on Mar. 27, 2007, the entirety of which is incorporated herein by reference.

BACKGROUND OF THE INVENTION

1. Field of the Invention

The present invention relates to a compact vehicle, and more particular, to a compact vehicle having a cushion bracket and a muffler bracket formed separately from the swing arm.

2. Background of the Invention

JP Patent No. 3485996 discloses a motorcycle. In the motorcycle, both ends of an axle of a rear wheel are journalled by a power unit and a swing arm fastened to the power unit. A rear cushion unit is provided between the swing arm and a body frame, and an exhaust muffler is arranged outside the swing arm.

In JP Patent No. 3485996, a lower part of the rear cushion unit is directly coupled to a cushion attachment part. The swing arm is integrally provided with the cushion attachment part, and the exhaust muffler is supported by an exhaust muffler supporting part integrated with the swing arm with the exhaust muffler supporting part protruded backward from the coupled part of the lower part of the rear cushion unit to the swing arm. However, in configuration that the cushion attachment part and the exhaust muffler supporting part are integrated with the swing arm as described above, the coupled part of the rear cushion unit and the exhaust muffler supporting part are separated depending upon the vertical length of the rear cushion unit and the shape of the exhaust muffler, the swing arm may be large-sized, and a degree of freedom in the shape and the design of the swing arm may be reduced.

SUMMARY OF THE INVENTION

An object of the present invention is to provide a compact vehicle where a degree of freedom in the shape and the design of a swing arm can be enhanced without being influenced by the variation of a part for supporting an exhaust muffler on the side of the swing arm and a part for coupling a rear cushion unit to the side of the swing arm.

To achieve the object, according to a first aspect of the present invention, a compact vehicle is provided. In the compact vehicle, a power unit provided with an internal combustion engine for producing power for driving a rear wheel is rockably supported by a body frame. Both ends of an axle of a rear wheel are journalled by the rear of the power unit and a swing arm fastened to the power unit with the rear wheel held between the swing arm and the rear of the power unit. An exhaust muffler of the internal combustion engine is arranged on the side of the swing arm of the rear wheel and a rear cushion unit is provided between the body frame and the swing arm. A bracket for the cushion coupled to a lower end of the rear cushion unit and a bracket for the muffler that supports the exhaust muffler are formed separately from the swing arm and are attached to the swing arm.

Furthermore, according to a second aspect of the present invention, the bracket for the cushion and the bracket for the muffler are fastened to the swing arm by jointly fastening in vertical plural locations.

Furthermore, according to a third aspect of the present invention, the bracket for the cushion and the bracket for the muffler are arranged so that the bracket for the muffler is overlapped with the bracket for the cushion from the outside in a side view.

Furthermore, according to a fourth aspect of the present invention, an opening for maintenance is provided to the bracket for the muffler in order to pass a fastening member for fastening the lower end of the rear cushion unit to the bracket for the cushion and a tool for operating the fastening member.

Furthermore, according to a fifth aspect of the present invention, the front of the bracket for the muffler is fastened to the swing arm in three or more plural locations, and a hole is provided to the bracket for the muffler in an area encircled by fastened locations.

Furthermore, according to a sixth aspect of the present invention, a catalyst is housed in the exhaust muffler arranged outside the swing arm except a position in which the catalyst is overlapped with the bracket for the cushion and the bracket for the muffler in the side view.

Furthermore, according to a third aspect of the present invention, a caliper of a disc brake installed on the rear wheel is supported by the swing arm, and the catalyst is housed in the exhaust muffler except a position in which the catalyst is overlapped with the caliper in the side view.

According to the first aspect of the present invention, as the bracket for the cushion and the bracket for the muffler which are respectively separate from the swing arm are attached to the swing arm, the variation of the part for supporting the exhaust muffler on the side of the swing arm and the part for coupling the rear cushion unit to the side of the swing arm can be handled by a change of contours of the bracket for the cushion and the bracket for the muffler, and a degree of freedom in the shape and the design of the swing arm can be enhanced.

Furthermore, according to the second aspect of the present invention, as the bracket for the cushion and the bracket for the muffler are fastened to the swing arm by jointly fastening at a plurality vertical locations, the number of parts required for fastening the bracket for the cushion and the bracket for the muffler to the swing arm can be reduced.

Furthermore, according to the third aspect of the present invention, the part for coupling the rear cushion unit to the bracket for the cushion can be protected from the outside by the bracket for the muffler.

Furthermore, according to the fourth aspect of the present invention, even if the bracket for the muffler is overlapped with the bracket for the cushion from the outside, operations for coupling the rear cushion unit to the bracket for the cushion and for releasing the coupling are facilitated.

Furthermore, according to the fifth aspect of the present invention, the large strength is not required for the area encircled by the three or more locations in which the bracket for the muffler is fastened to the swing arm, and the bracket for the muffler can be lightened by providing the hole to the area of the bracket for the muffler without having an effect upon the handling of the bracket for the muffler and the attachment of the exhaust muffler to the bracket for the muffler.

Furthermore, according to the sixth aspect of the present invention, as the catalyst housed in the exhaust muffler arranged outside the swing arm, the bracket for the cushion and the bracket for the muffler are not overlapped in the side view, and the transmission of heat caused in the catalyst to the bracket for the cushion and the bracket for the muffler can be inhibited and the thermal effect upon the rear cushion unit can be minimized.

Furthermore, according to the seventh aspect of the present invention, as the catalyst in the exhaust muffler and the caliper supported by the swing arm are not overlapped in the side view, the transmission of heat caused in the catalyst to the side of the caliper can be inhibited and the thermal effect upon the caliper can be minimized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE ILLUSTRATED EMBODIMENTS

Figure 1:
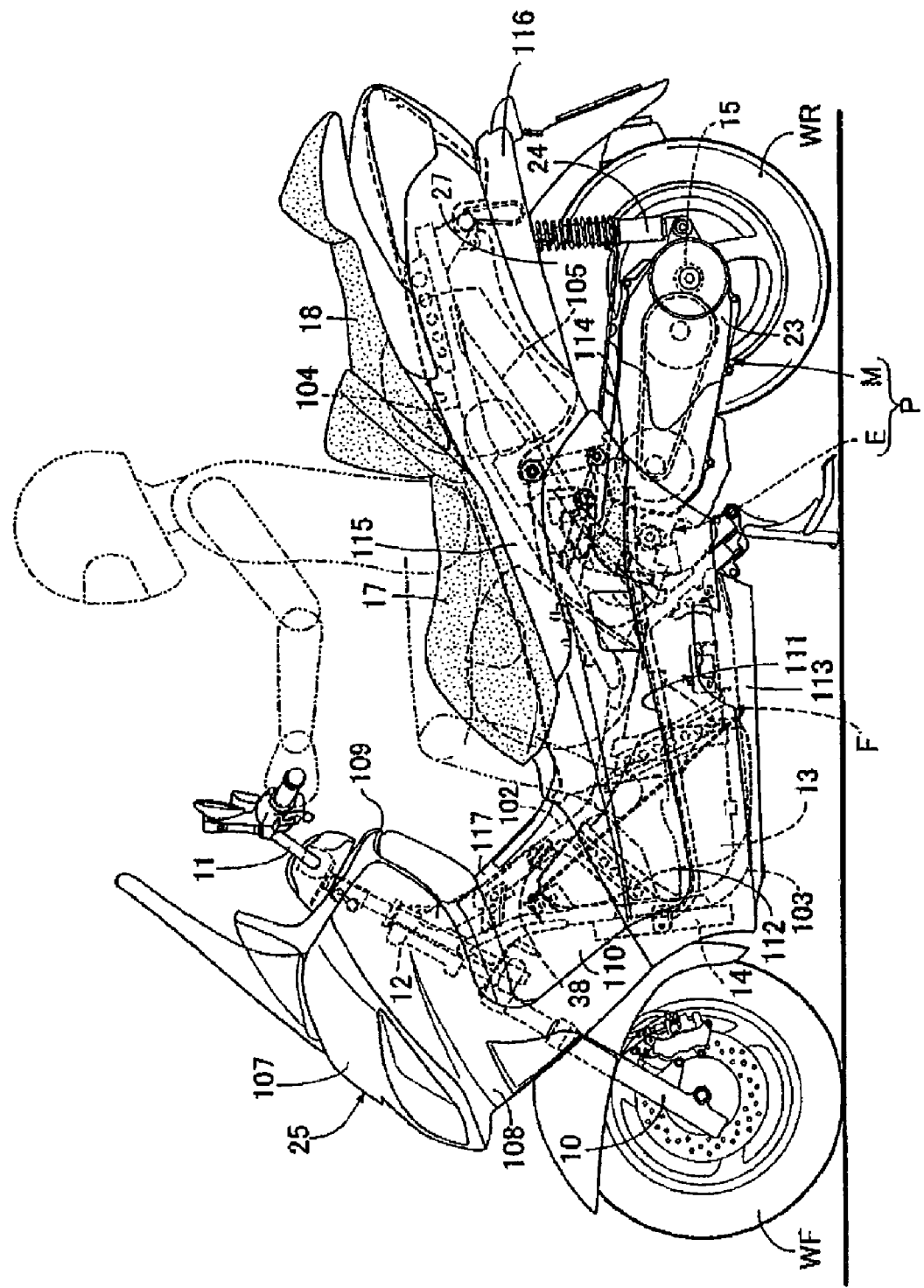
FIG. 1 is a left side view showing a scooter-type motorcycle in accordance with an embodiment of the present invention.

The present invention will now be described in detail with reference to the accompanying drawings, wherein the same reference numerals will be used to identify the same or similar elements throughout the several views. It should be noted that the drawings should be viewed in the direction of orientation of the reference numerals.

FIGS. 1-11 show a first embodiment of the present invention. As shown in FIG. 1, a body frame F of the scooter-type motorcycle (a compact vehicle) is provided with a front fork 10, a head pipe 12, a power unit P a fuel tank 13, and a radiator 14. The front fork 10 journals a front wheel WF The head pipe 12 steerably supports a steering handlebar 11 coupled to the front fork 10 at the front end of the body frame. The power unit P supports an axle 15 of the rear wheel WR by a rear end is supported vertically rockably in an intermediate part in a longitudinal direction of the body frame F The fuel tank 13 is formed vertically long when the fuel tank is viewed from the side, and a radiator 14 arranged in front of the fuel tank 13 is mounted on the body frame F in front of the power unit R Besides, in the rear of the body frame F, a rider's seat 17 and a pillion seat 18 arranged at the back of the rider's seat 17 are arranged. Further, a synthetic resin body cover 25 that covers the body frame F; the front of the power unit P, the fuel tank 13 and the radiator 14 is attached to the body frame F.

The body frame F is provided with the head pipe 12, a pair of right and left upper down frames 102, a pair of right and left lower down frames 103, a pair of right and left seat rails 104 and a pair of right and left rear frames 105. The pair of right and left upper down frames 102 is coupled to the head pipe 12 and extended backward and downward. In each of the pair of right and left lower down frames 103, a front half is coupled to the head pipe 12 on the downside of the upper down frames 102 and extended backward and downward, and a rear half extended backward and horizontally are integrated and a rear end of each of which is welded to a rear end of each upper down frame 102. The pair of right and left seat rails 104 is extended backward and upward from each intermediate part of both upper down frames 102. The pair of right and left rear frames 105 each couples the rear of each upper down frame 102 and the rear of each seat rail 104.

The body cover 25 is provided with a front cover 107, a pair of right and left front side covers 108, an inner cover 109, leg shields 110, a pair of right and left floor center covers 112, a pair of right and left floor side covers 113, and a pair of right and left body side covers 115, and a rear lower cover 116. A floor tunnel 117 that rises upward between both footrests 111 and houses the fuel tank 13 and the radiator 14 is formed from the back of the head pipe 12 to the downside of a front end of the rider's seat 17 by a part of the leg shields 110 and the floor center covers 112. The front cover 107 covers the front of the head pipe 12 and the upside of the front wheel WF. The pair of right and left front side covers 108 is bonded to both right and left sides of the front cover 107. The inner cover 109 covers the head pipe 12 from its back and ranges to the front side covers 108. The leg shields 110 cover each front of legs of a rider who rides on the rider's seat 17 and each of the leg shields 110 is bonded to each front side cover 108 and the inner cover 109. The pair of right and left floor center covers 112 ranges at the back of each leg shield 110 and is extended backward, and each lower end of the right and left floor center covers 112 forms a footrest 111 for the rider to put his/her legs. The pair of right and left floor side covers 113 hangs downward from an outer edge of each footrest 111. The pair of right and left pillion passenger steps 114 is provided to the rear of the footrest 111. The pair of right and left body side covers 115 is arranged on each downside of both sides of the rider's seat 17 and the pillion seat 18 and extended backward along each floor side cover 113. The rear lower cover 116 is provided on the downside of the rear of each body side cover 115.

The power unit P is configured by an internal combustion engine E and a transmission M. The internal combustion engine E is arranged on the front side of the rear wheel WR. The transmission M includes a V-belt continuously variable transmission and a speed reducing gear train (not shown) that decelerates the output of the continuously variable transmission and transmits it to the axle 15 of the rear wheel WR and arranged on the left side of the rear wheel WR.

Figure 2:
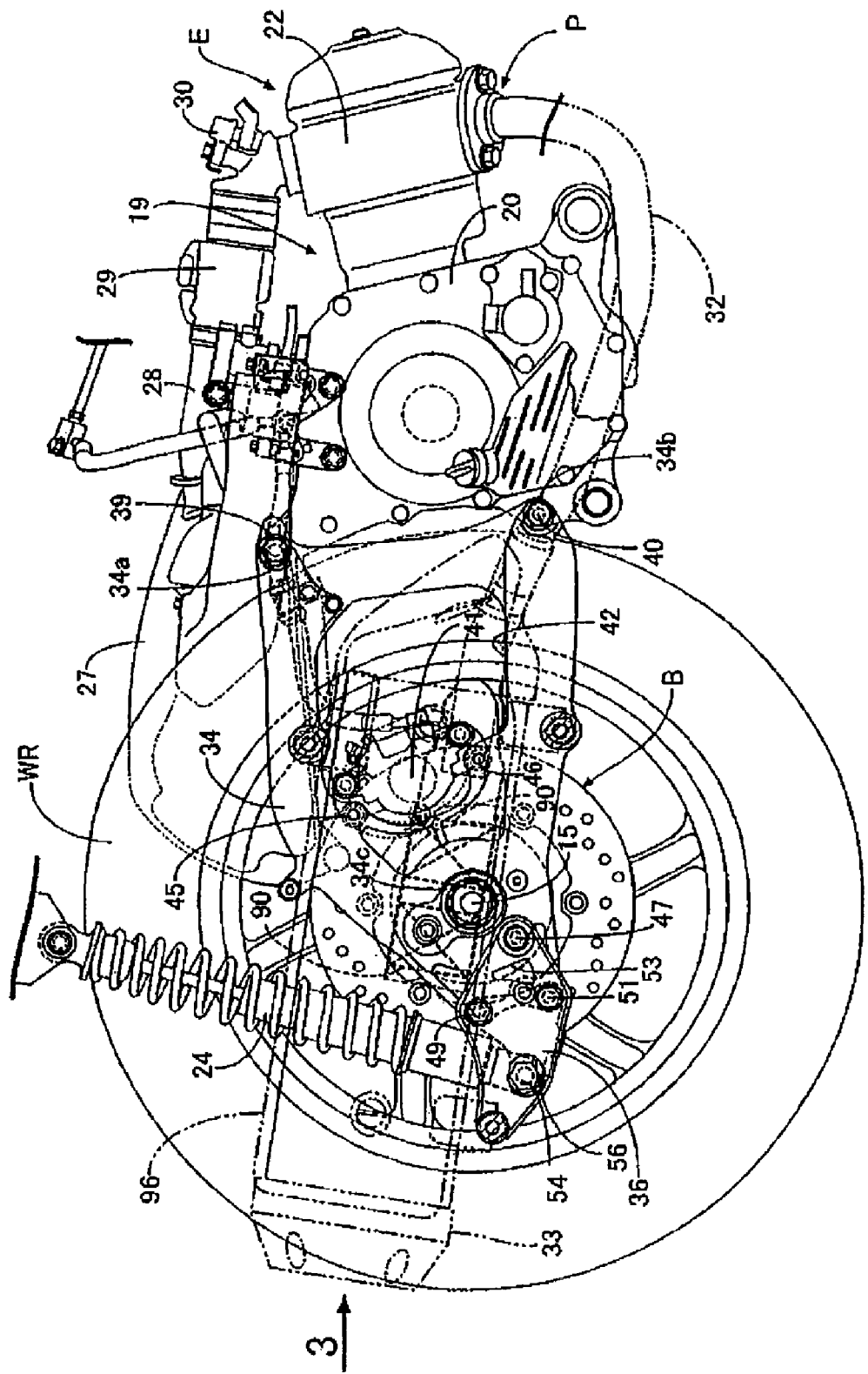
FIG. 2 is a right side view showing a power unit and a rear wheel in which an exhaust muffler and a muffler cover are omitted.

As shown in FIG. 2, the internal combustion engine E is a single-cylinder water-cooled 4-cycle engine. A transmission case 23 (see FIG. 1) extended on the left side of the rear wheel WR connects with a crankcase 20 forming a part of an engine main unit 19, and the transmission M is housed in the transmission case 23. A swing arm 34 is extended on the right side of the rear wheel WR with the rear wheel WR held between the swing arm and the transmission case 23 of the power unit P. The swing arm 34 is fixed to the crankcase 20 and both ends of the axle 15 of the rear wheel WR are journalled by the rear of the transmission case 23 in the power unit P and the rear of the swing arm 34. Each rear cushion unit 24 is provided between the rear of each seat rail 104 of the body frame F and the rear of the transmission case 23 or the rear of the swing arm 34.

An air cleaner 27 is arranged on the upside of the transmission case 23 with the air cleaner supported by the transmission case 23. An upstream end of an inlet pipe 28 is connected to the air cleaner 27. A throttle body 29 is provided between a downstream end of the inlet pipe 28 and a cylinder head 22 of the engine main unit 19. A fuel injection valve 30 that injects fuel into air that passes the throttle body 29 is attached to the cylinder head 22.

An upstream end of an exhaust pipe 32 is extended from a lower part of the right side of the crankcase 20 to the right side of the rear wheel WR. The upstream end of an exhaust pipe 32 is connected to the side of a lower part of the cylinder head 22. An exhaust muffler 33 is arranged in a position holding the swing arm 34 between the exhaust muffler and the rear wheel WR. The exhaust muffler 33 is connected to a downstream end of the exhaust pipe 32.

Figure 3:
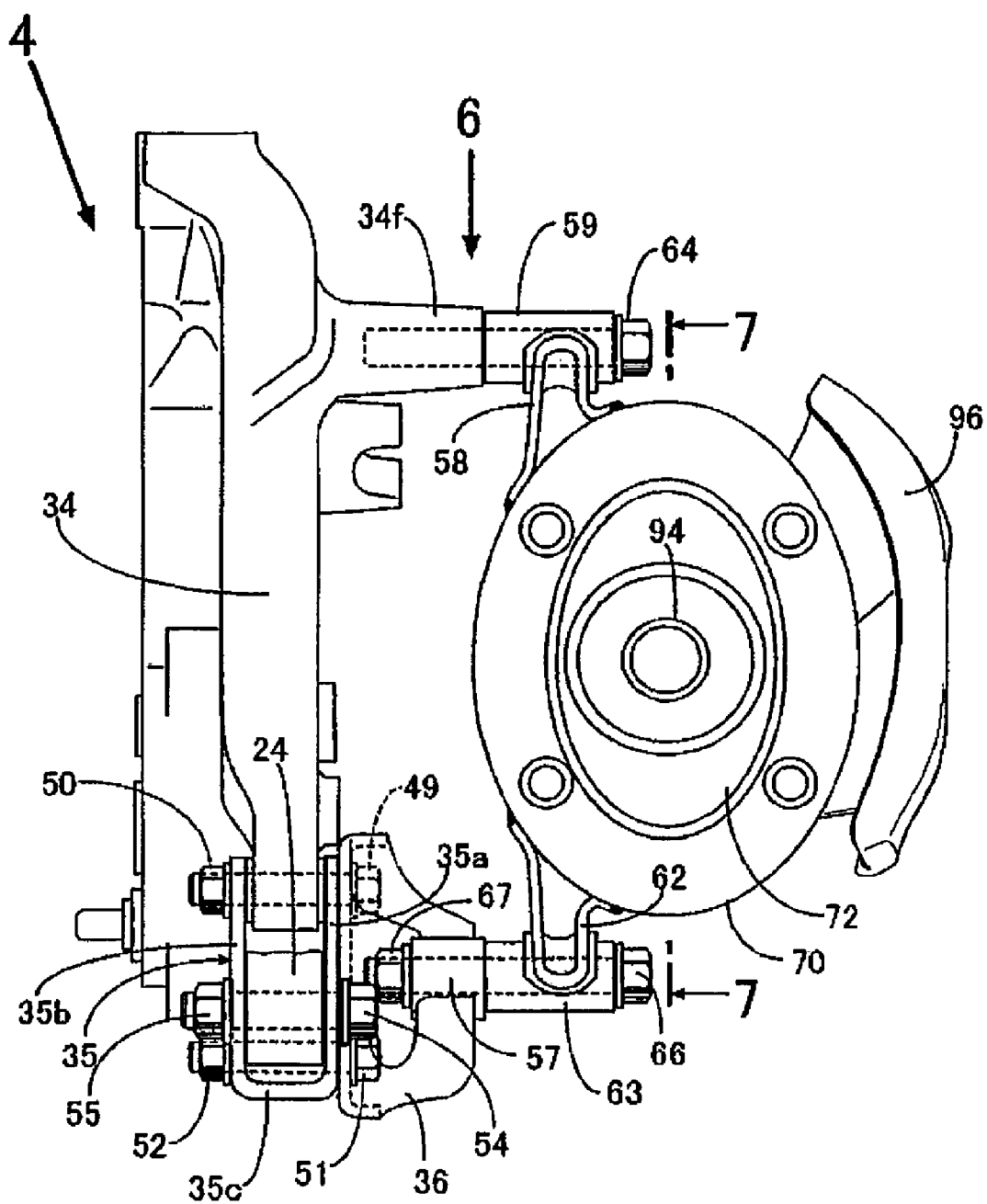
FIG. 3 shows a swing arm and the exhaust muffler respectively viewed from a direction shown by an arrow 3 in FIG. 2.
Figure 4:
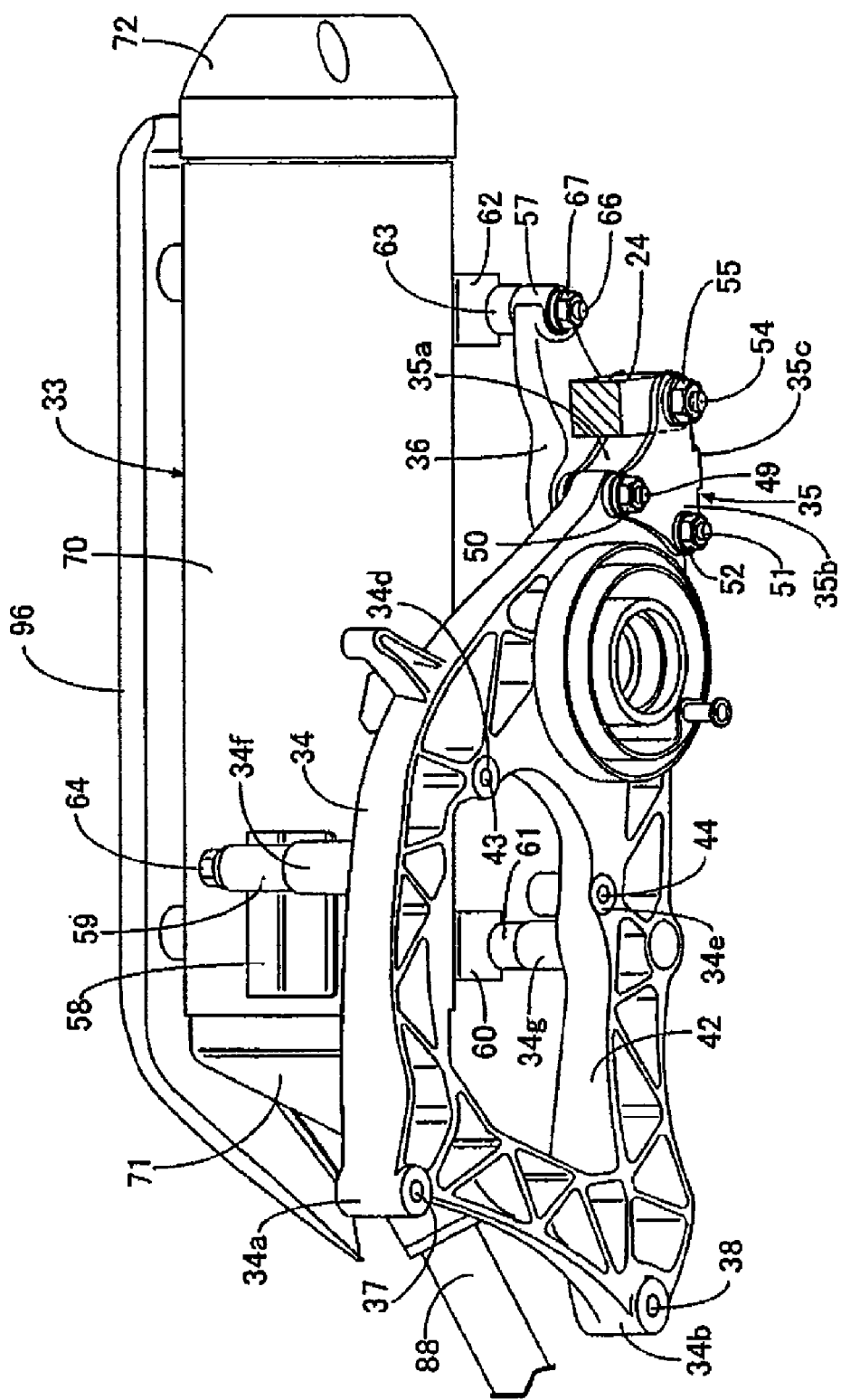
FIG. 4 is a perspective view from a direction shown by an arrow 4 in FIG. 3 and a part of which is cut off.
Figure 5:
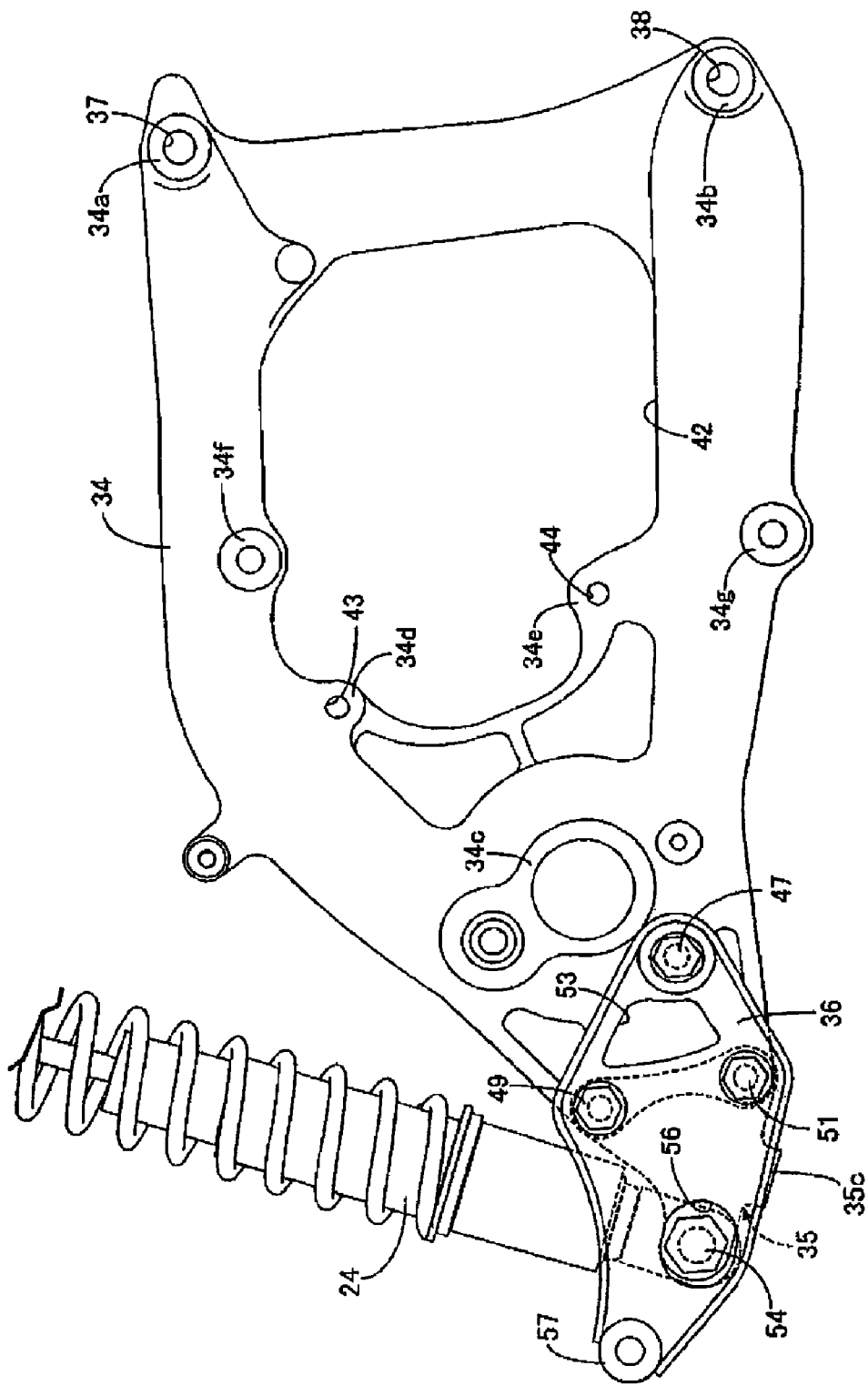
FIG. 5 is a side view showing the swing arm in which a bracket for the cushion and a bracket for the muffler are attached.

As also shown in FIGS. 3 to 5, two vertical locations of the front of the swing arm 34 are fastened to the crankcase 20 of the engine main unit 19. The bracket 35 for the cushion and the bracket 36 for the muffler respectively formed separately from the swing arm 34 are attached to the rear of the swing arm 34. A lower part of the rear cushion unit 24 is coupled to the bracket 35 for the cushion. Two vertical locations of an intermediate part in a longitudinal direction of the muffler 33 are supported by the swing arm 34. The rear of the exhaust muffler 33 is supported by the bracket 36 for the muffler.

Mounting bosses 34a, 34b having insertion holes 37, 38 are integrated with two locations vertically having an interval of the front of the swing arm 34 and the front of the swing arm 34 is fastened to the crankcase 20 by bolts 39, 40 (see FIG. 2) inserted into the insertion holes 37, 38.

An axle support part 34c that supports the axle 15 of the rear wheel WR is provided to the rear of the swing arm 34. An opening 42 opposite to a caliper 41 of a disc brake B mounted on the rear wheel WR is provided to the swing arm 34 among both mounting bosses 34a, 34b and the axle support part 34c. Supporting bosses 34d, 34e are provided to the swing arm 34 in two locations vertically holding the front of the opening 42 between the supporting bosses. The caliper 41 is fastened to the swing arm 34 by bolts 45, 46 (see FIG. 2) inserted into supporting holes 43, 44 with which the supporting bosses 34d, 34e are provided.

The bracket 36 for the muffler is attached to an outside face of the rear of the swing arm 34 at the back of the axle support part 34c with the bracket protruded backward from a rear end of the swing arm 34. The front of the bracket 36 for the muffler is fastened to the swing arm 34 in plural (three or more) locations (in three locations in this embodiment). That is, a front end of the bracket 36 for the muffler is fastened to the swing arm 34 by one bolt 47 and the bracket 36 for the muffler is fastened to the swing arm 34 by bolts 49, 51 and nuts 50, 52 in two vertical locations at the back of the bolt 47 and a nut 48.

In addition, a hole 53 is provided to the bracket 36 for the muffler in an area encircled by the three locations in which the bracket is fastened to the swing arm 34.

In the meantime, the bracket 35 for the cushion is integrally provided with a first side plate 35a, a second side plate 35b and a coupling part 35c. The first side plate 35a is held between the bracket 36 for the muffler and the outside face of the rear of the swing arm 34. The second side plate 35b is touched to an inside face of the swing arm 34. The coupling part 35c is couples lower parts of the first and second side plates 35a, 35b and is formed in a substantial U-shape. The first and second side plates 35a, 35b that hold the rear of the swing arm 34 from both sides are jointly fastened to the swing arm 34 together with the bracket 36 for the muffler by the bolts 49, 51 and the nuts 50, 52 in the vertical two locations on the rear side out of the three locations in which the bracket 36 for the muffler is fastened to the swing arm 34.

A lower end of the rear cushion unit 24 is inserted between the first and second side plates 35a, 35b of the bracket 35 for the cushion at the back of the swing arm 34. The lower end of the rear cushion unit 24 is fastened to the bracket 35 for the cushion by screwing a nut 55 touched and fitted to the second side plate 35b on a bolt 54 that pierces the first side plate 35a, the rear cushion unit 24 and the second side plate 35b from the outside of the first side plate 35a.

In addition, the bracket 35 for the cushion and the bracket 36 for the muffler are arranged so that the bracket 36 for the muffler is overlapped with the bracket 35 for the cushion from the outside when they are viewed from the sides. An opening for maintenance 56 for passing the bolt 54 is provided to the bracket 36 for the muffler in order to fasten the lower end of the rear cushion unit 24 to the bracket 35 for the cushion and a tool for operating the bolt 54.

Cylindrical supporting bosses 34f, 34g are integrally protruded from positions vertically holding the opening 42 in an intermediate part in a longitudinal direction of the swing arm 34 and a cylindrical supporting boss 57 is provided to the bracket 36 for the muffler.

Figure 6:
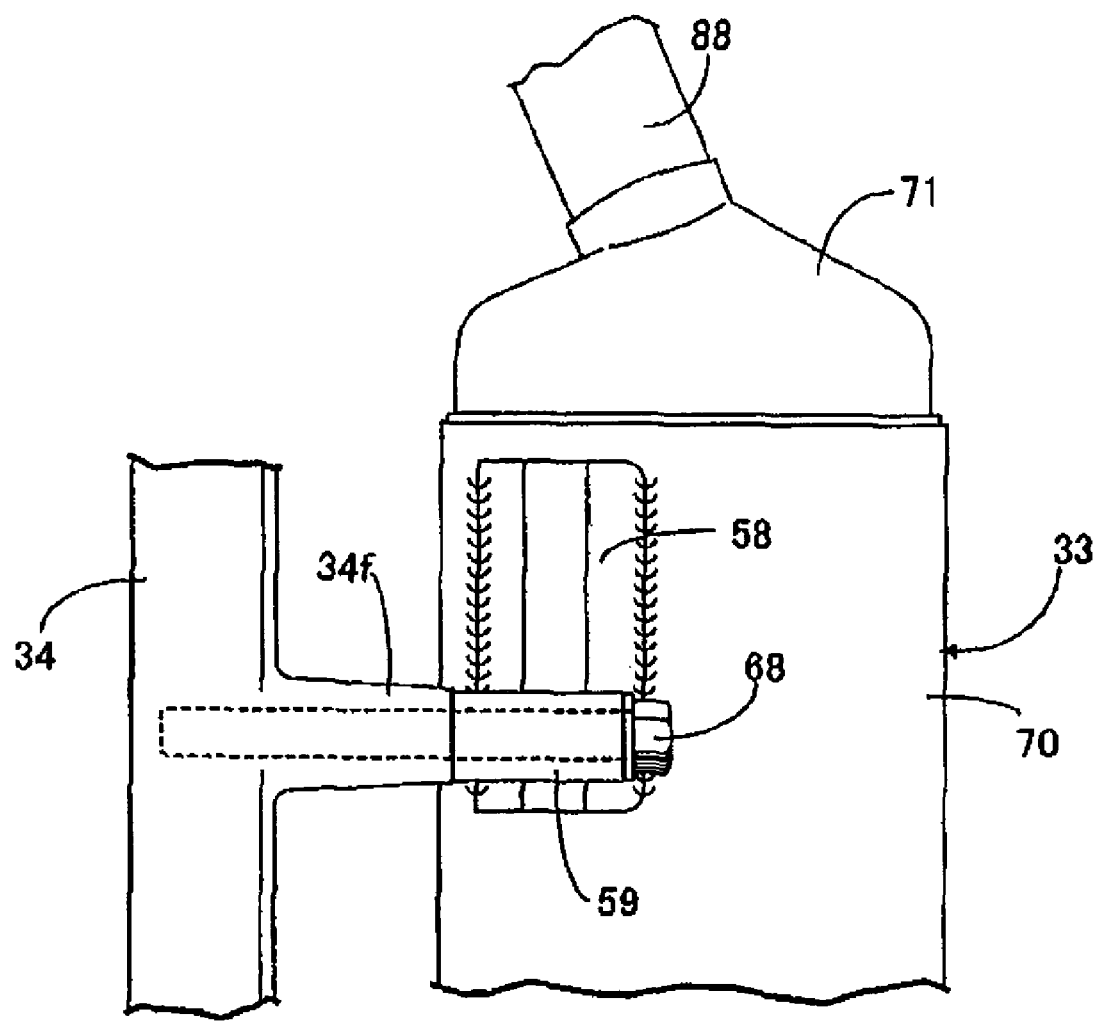
FIG. 6 is a view viewed from a direction shown by an arrow 6 in FIG. 3.

As also shown in FIG. 6, stays 58, 60 made by pressing a metal plate are welded to an outside face of an outer cylinder 70 of the exhaust muffler 33 corresponding to the supporting bosses 34f, 34g of the swing arm 34. Bolts 64 inserted into cylindrical collars 59, 61 fastened to the stays 58, 60 and coaxially touched to the supporting bosses 34f, 34g are screwed to the supporting bosses 34f, 34g. A stay 62 made by pressing a metal plate is welded to the outside face of the outer cylinder 70 of the exhaust muffler 33 in a position corresponding to the supporting boss 57 of the bracket 36 for the muffler, and a cylindrical collar 63 coaxially touched to the supporting boss 57 is fastened to the stay 62. A nut 67 touched and fitted to the supporting boss 57 is screwed to a bolt 66 inserted into the collar 63 and the supporting boss 57, and the exhaust muffler 33 is supported by the swing arm 34 and the bracket 36 for the muffler by tightening both bolts 64 and the nut 67.

Figure 7:
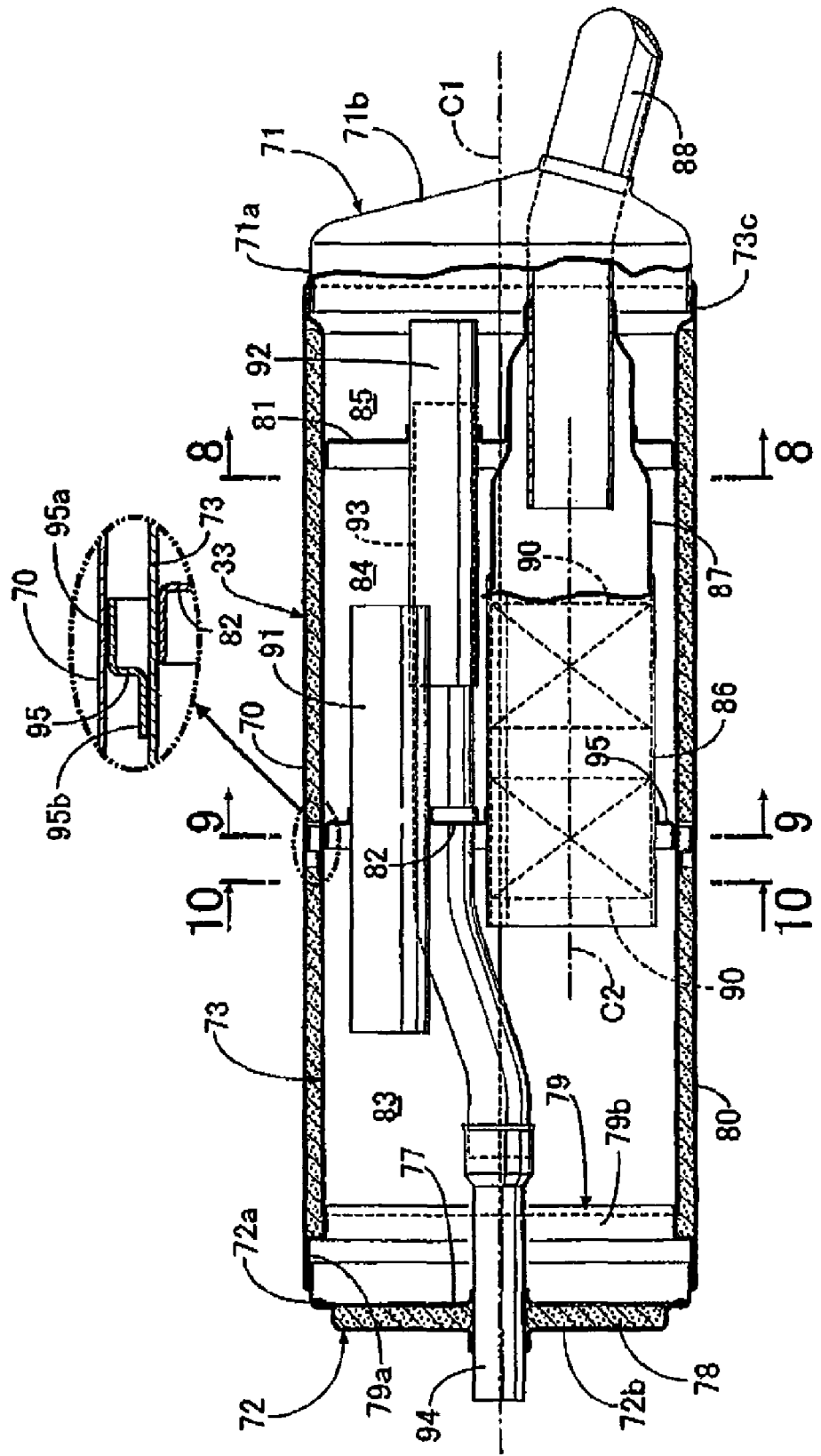
FIG. 7 is a sectional view showing the exhaust muffler along a line 7-7 shown in FIG. 3.

As shown in FIG. 7, the exhaust muffler 33 is provided with the outer cylinder 70, a first end wall member 71 that closes one end of the outer cylinder 70, a second end wall member 72 that closes the other end of the outer cylinder 70 and an inner cylinder 73 coaxially arranged in the outer cylinder 70.

The first end wall member 71 is integrally provided with a cylindrical part 71a inserted on the side of one end of the outer cylinder 70 and an end wall part 71b formed so that a diameter of the end wall part is sequentially extended toward the side of the outer cylinder 70 with a position biased from an central axis C1 of the outer cylinder 70 and the inner cylinder 73 as a small-diameter end and with a part ranging to the cylindrical part 71a as a large-diameter end. The second end wall member 72 is integrally provided with a cylindrical part 72a inserted on the other end side of the outer cylinder 70 and a dished end wall part 72b coaxially ranging to the cylindrical part 72a, and the periphery of an end plate 77 that holds thermal insulating and noise absorbing material 78 between the end plate and the end wall part 72b is fastened to the second end wall member 72.

Figure 8:
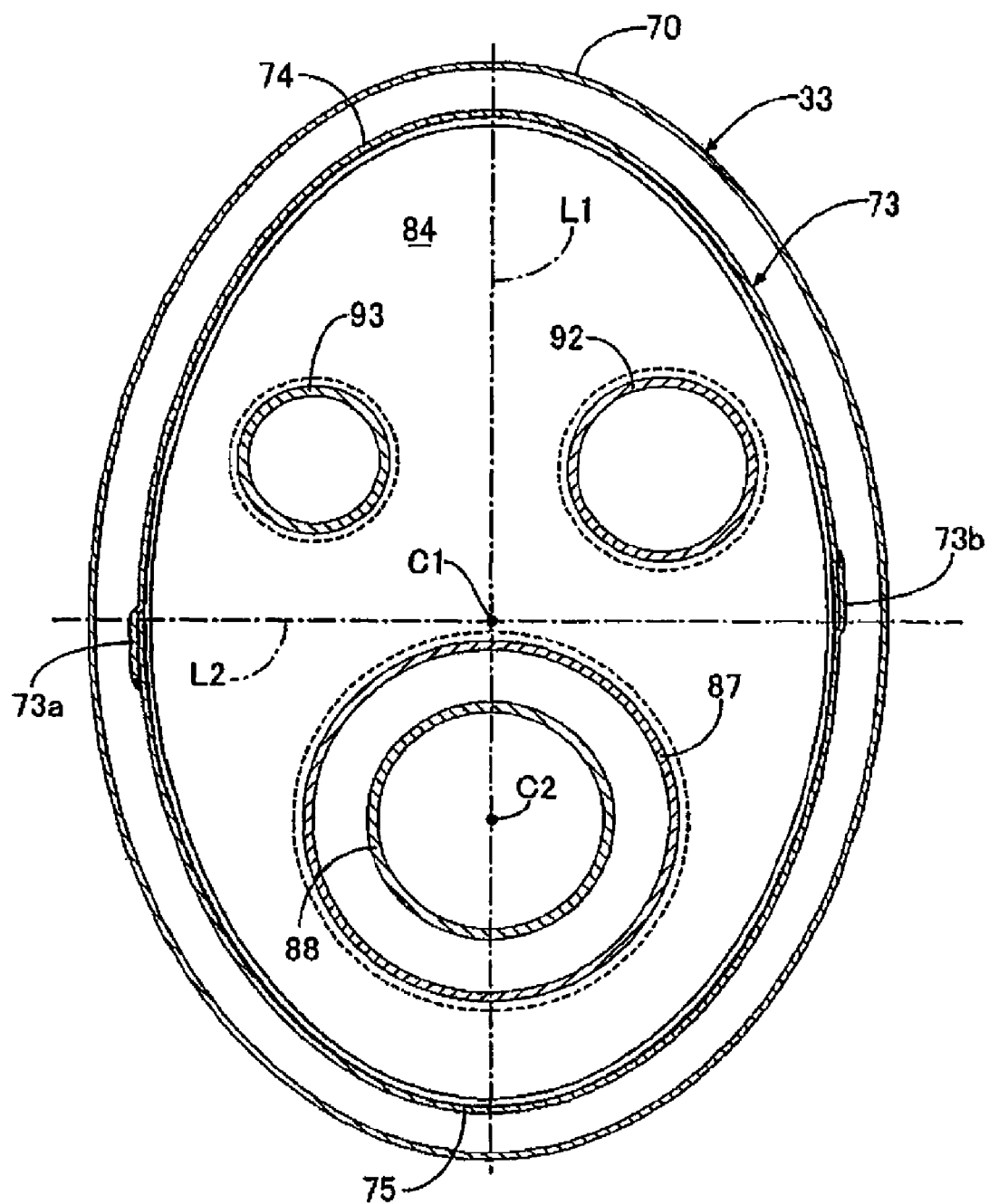
FIG. 8 is a sectional view along a line 8-8 shown in FIG. 7.
Figure 9:
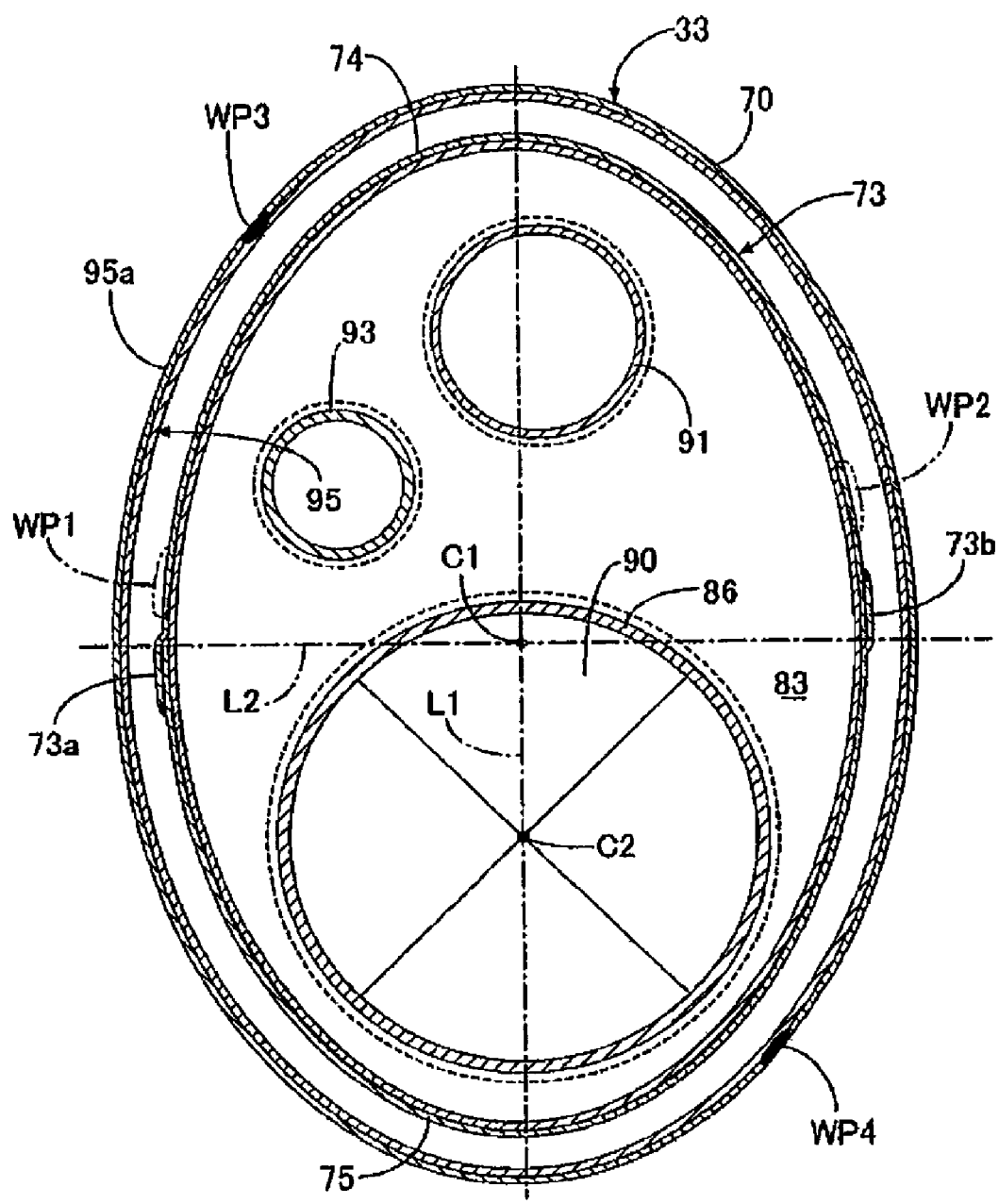
FIG. 9 is a sectional view along a line 9-9 shown in FIG. 7.
Figure 10:
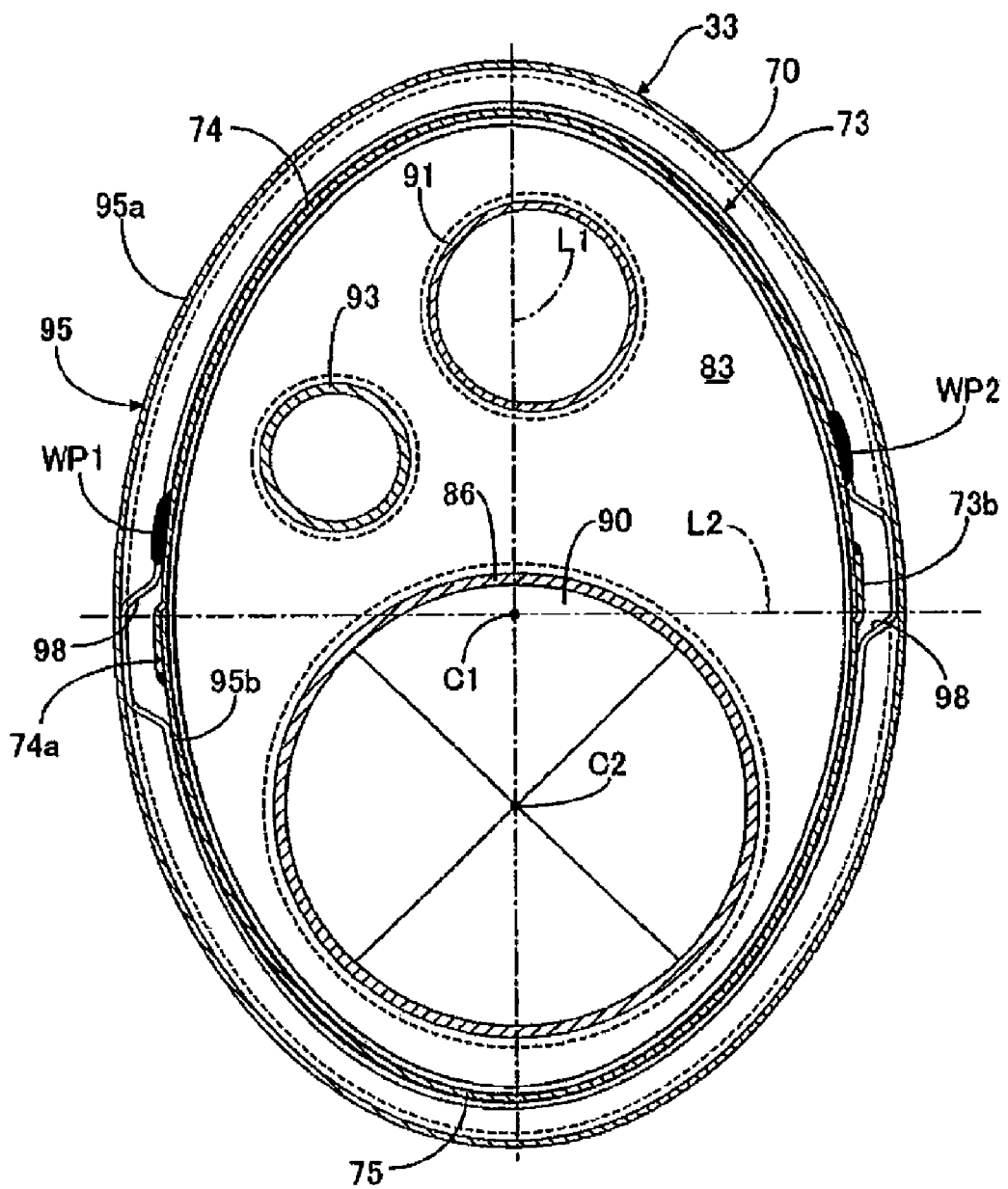
FIG. 10 is a sectional view along a line 10-10 shown in FIG. 7.

As also shown in FIGS. 8 to 10, the outer cylinder 70 is formed so that its cross section is in the shape of a cross section of an ellipse having its vertical direction as a longitudinal direction, the inner cylinder 73 is also formed so that its cross section is in the shape of a cross section of an ellipse coaxial with the outer cylinder 70, and the inner cylinder is arranged inside the outer cylinder 70.

Figure 11:
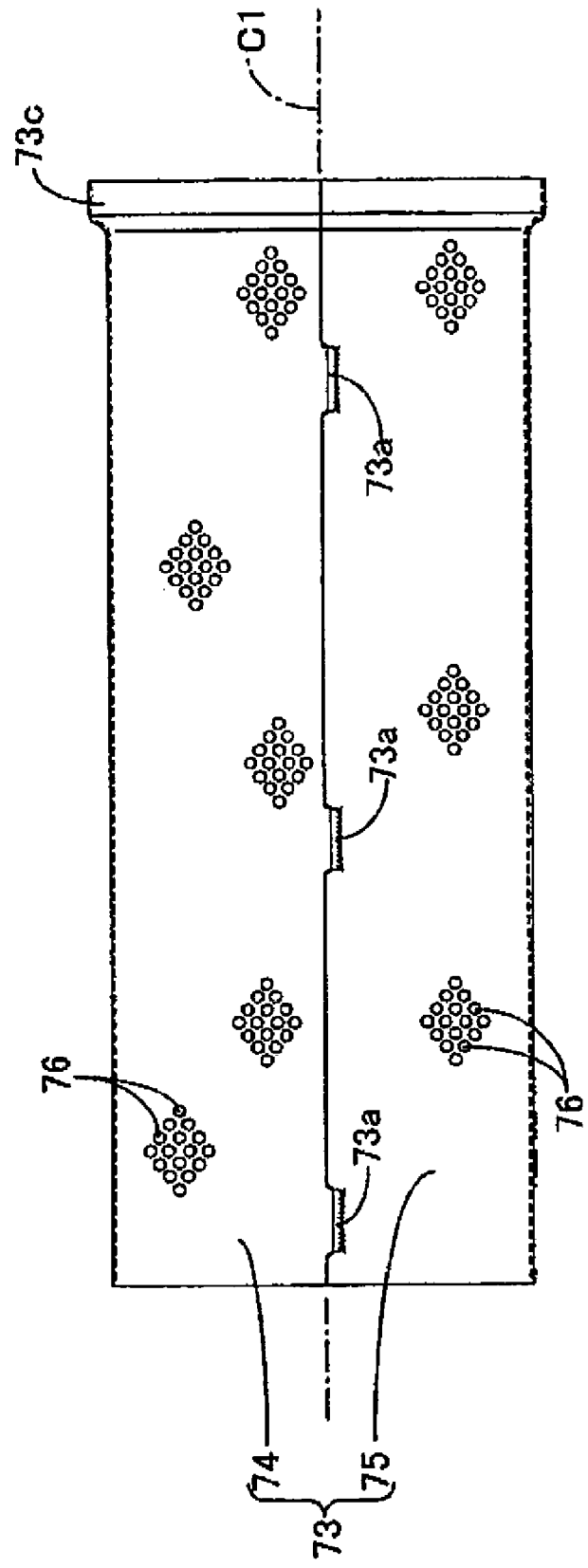
FIG. 11 is a side view showing an inner cylinder.

In addition, as also shown in FIG. 11, the inner cylinder 73 is formed by welding and connecting plural, for example, two inner cylinder configuring members 74, 75 at split faces along a central axis C1 of the outer cylinder 70 and the inner cylinder 73. More specifically, the inner cylinder 73 is formed by overlapping plural locations at an interval in an axial direction on one end side in a circumferential direction of one inner cylinder configuring member 74 with the other end in a circumferential direction of the other inner cylinder configuring member 75 from the outside, overlapping plural locations at intervals in an axial direction on one end side in the circumferential direction of the other inner cylinder configuring member 75 with the other end in the circumferential direction of one inner cylinder configuring member 74 from the outside, and welding overlapped parts of both inner cylinder configuring members 74, 75. Therefore, uplifted parts 73a, 73b uplifted from the periphery of the inner cylinder 73 are formed on the inner cylinder 73 in locations where both inner cylinder configuring members 74, 75 are welded.

An extended-diameter part 73c is fitted to one end in an axial direction of the outer cylinder 70 and to which the cylindrical part 71a of the first end wall member 71. The extended-diameter part 73c is fitted is formed on one end side in an axial direction of the inner cylinder 73. One end in the axial direction of the outer cylinder 70, the extended-diameter part 73c and the cylindrical part 71a holding the extended-diameter part 73c between the cylindrical part and the outer cylinder 70 are welded in common. That is, one end of the inner cylinder 73 is fastened to the outer cylinder 70 and the first end wall member 71.

In the meantime, the second end wall member 72 and a supporting cylinder 79 are welded to the other end of the outer cylinder 70 in common. The supporting cylinder 79 is integrally provided with a large-diameter part 79a and a small-diameter part 79b. The cylindrical part 72a is fitted to the large-diameter part 79a and the large-diameter part 79a is fitted to the other end of the outer cylinder 70. The small-diameter part 79b has a smaller diameter than the large-diameter part 79a. The supporting cylinder 79 is formed in the shape of a stepped cylinder. The cylindrical part 72a, the large-diameter part 79a and the other end of the outer cylinder 70 are welded with them mutually overlapped in common.

In addition, the small-diameter part 79b of the supporting cylinder 79 is fitted to the other end of the inner cylinder 73 and the other end of the inner cylinder 73 is supported slidably axially by the small-diameter part 79b of the supporting cylinder 79 fastened to the outer cylinder 70.

Multiple small holes 76 are bored on the inner cylinder 73, and thermal insulating and noise absorbing material 80 is filled in circular space formed between the outer cylinder 70 and the inner cylinder 73.

The peripheries of first and second bulkheads 81, 82 arranged at an interval along the central axis C1 of the inner cylinder 73 are fastened to an inner circumference of the inner cylinder 73. A first expansion chamber 83 is formed between the second bulkhead 82 and the second end wall member 72 in the inner cylinder 73. A second expansion chamber 84 is formed between the first and second bulkheads 81, 82 in the inner cylinder 73. A third expansion chamber 85 is formed between the first bulkhead 81 and the first end wall member 71 in the inner cylinder 73.

A cylindrical catalyst case 86 provided with a central axis C2 parallel to the central axis C1 and piercing the second bulkhead 82 airtightly is arranged in a position biased downward in a longer-diameter direction from the central axis C1 of the inner cylinder 73 and the outer cylinder 70, that is, a central axis C1 of the exhaust muffler 33 in the inner cylinder 73, and an introduction cylinder 87 which pierces the first bulkhead 81 airtightly and a diameter of which is sequentially larger toward the catalyst case 86 is coaxially coupled to the catalyst case 86.

In the meantime, an inlet pipe 88 ranging to the exhaust pipe 32 airtightly pierces the small-diameter end of the end wall part 71b of the first end wall member 71, and is plunged in the introduction cylinder 87. Therefore, exhaust gas conducted in the exhaust pipe 32 is conducted into the catalyst case 86 via the introduction cylinder 86 from the inlet pipe 88. In addition, a catalyst 90 is housed in two locations at an interval along the central axis C2 in the catalyst case 86. The exhaust gas conducted into the catalyst case 86 is purified owing to the catalyst 90, and is conducted into the first expansion chamber 83.

A first communicating pipe 91 that airtightly pierces the second bulkhead 82 communicates with both first and second expansion chambers 83, 84 and a second communicating pipe 92 that airtightly pierces the first bulkhead 81 communicates with both second and third expansion chambers 84, 85. In addition, one end of a third communicating pipe 93 communicates with the third expansion chamber 85 airtightly pierces the first and second bulkheads 81, 82 and is extended to the first expansion chamber 83. A tail pipe 94 connected to the third communicating pipe 93 in the third expansion chamber 83 is arranged coaxially with the central axis C1 of the exhaust muffler 33. The tail pipe 94 airtightly pierces the end plate 77, the thermal insulating and noise absorbing material 78 and the second end wall member 72, and is protruded outside.

A supporting ring 95 is arranged between the outer cylinder 70 and the inner cylinder 73 in positions corresponding to the catalysts 90 in a longitudinal direction of the outer cylinder 70 and the inner cylinder 73. The supporting ring 95 is provided with a large-diameter cylindrical part 95a touched to an inside face of the outer cylinder 70 and a small-diameter cylindrical part 95b touched to an outside face of the inner cylinder 73. Two locations at an interval in a circumferential direction of the large-diameter cylindrical part 95a are welded to the outer cylinder 70, and two locations at an interval in a circumferential direction of the small-diameter cylindrical part 95b are welded to the inner cylinder 73.

The small-diameter cylindrical part 95b of the supporting ring 95 is welded to the inner cylinder 73 in welded locations WP1, WP2 set in the vicinity of the two locations which are perpendicular to a first plane L1 passing the central axis C1 of the exhaust muffler 33 and the central axis C2 of the catalyst case 86 and the catalyst 90 and in which a second plane L2 passing the central axis C1 of the exhaust muffler 33 crosses the inner cylinder 73. The outer cylinder 70 and the inner cylinder 73 have an elliptic cross section. The central axis C2 of the catalyst 90 is located in a position biased downward in a direction of a long diameter from the central axis C1 of the outer cylinder 70 and the inner cylinder 73. The second plane L2 passes the central axis C1 of the exhaust muffler 33 in a direction of a short diameter.

The large-diameter cylindrical part 95a of the supporting ring 95 is welded to the outer cylinder 70 in two welded locations WP3, WP4 which avoid the welded locations of the supporting ring 95 to the inner cylinder 73 in a circumferential direction of the outer cylinder 70 and which are substantially symmetrical based upon the central axis C1 of the exhaust muffler 33. In this embodiment, as shown in FIG. 9, the welded locations WP3, WP4 are set in positions offset from the second plane L2 by 60 degrees. In welding the supporting ring 95 to the outer cylinder 70, a hole for welding is provided to the outer cylinder 70 in the welded locations WP3, WP4, and an outside face of the large-diameter cylindrical part 95a of the supporting ring 95 is welded to the outer cylinder 70 by burying the hole.

In addition, recessed portions 98 corresponding to the uplifted parts 73a, 73b arranged in plural locations (two locations in this embodiment) at intervals in the circumferential direction of the inner cylinder 73 are formed in plural locations at intervals in the inside circumferential direction of the supporting ring 95 (two locations in this embodiment), and the uplifted parts 73a, 73b can pass the recessed portions 98.

The exhaust muffler 33 is arranged outside the swing arm 34, and the catalysts 90 are housed in the exhaust muffler 33 except positions overlapped with the bracket 35 for the cushion and the bracket 36 for the muffler in a side view and except positions overlapped with the caliper 41 of the disc brake B installed on the rear wheel WR in the side view as shown in FIG. 2.

A muffler cover 96 that covers the exhaust muffler 33 from the outside is attached to the outer cylinder 70 of the exhaust muffler 33 by a pair of screws 97, for example, and at least one of the two welded locations WP3, WP4 of the supporting ring 95 to the outer cylinder 70 (the welded location WP4 in this embodiment) is covered with the muffler cover 96.

Next, the action of the first embodiment will be described hereinbelow. As the swing arm 34 that journals the axle 15 of the rear wheel R in cooperation with the rear of the power unit P is fastened to the power unit P, and the bracket 35 (for the cushion coupled to the lower end of the rear cushion unit 24 provided between the body frame F and the swing arm 34) and the bracket 36 (for the muffler that supports the exhaust muffler 33) are formed separately from the swing arm 34 and are attached to the swing arm 34, the variation of the parts that support the exhaust muffler 33 on the side of the swing arm 34 and the parts that couple the rear cushion unit 24 to the swing arm 34 can be handled by a change of contours of the bracket 35 for the cushion and the bracket 36 for the muffler and a degree of freedom in the shape and the design of the swing arm 34 can be enhanced.

As the bracket 35 for the cushion and the bracket 36 for the muffler are fastened to the swing arm 34 by jointly fastening in the vertical two locations, the number of parts required for fastening the bracket 35 for the cushion and the bracket 36 for the muffler to the swing arm 34 can be reduced.

As the bracket 35 for the cushion and the bracket 36 for the muffler are arranged so that the bracket 36 for the muffler is overlapped with the bracket 35 for the cushion from the outside in a side view, a part for coupling the rear cushion unit 24 to the bracket 35 for the cushion can be protected from the outside by the bracket 36 for the muffler.

In addition, an opening for maintenance 56 for passing the bolt 54 for fastening the lower end of the rear cushion unit 24 to the bracket 35 for the cushion and a tool for operating the bolt 54 is provided to the bracket 36 for the muffler and in arrangement that the bracket 36 for the muffler is overlapped with the bracket 35 for the cushion from the outside, operations for coupling the rear cushion unit 24 to the bracket 35 for the cushion and for releasing the coupling are also facilitated.

Further, the front of the bracket 36 for the muffler is fastened to the swing arm 34 in three or more plural locations (three locations in this embodiment) and the hole 53 is provided to the bracket 36 for the muffler in an area encircled by the fastened locations. As the large strength is not required for the area encircled by the three or more locations in which the bracket 36 for the muffler is fastened to the swing arm 34, the bracket for the muffler can be lightened by providing the hole 53 to the area of the bracket 36 for the muffler without having an effect upon the handling of the bracket 36 for the muffler and the attachment of the exhaust muffler 33 to the bracket 36 for the muffler.

The catalysts 90 are housed in the inner cylinder 73 of the exhaust muffler 33 in positions biased from the central axis of the inner cylinder 73. The supporting ring 95 is arranged between the outer cylinder 70 and the inner cylinder 73 in the positions corresponding to the catalysts 90 in a longitudinal direction of the inner cylinder 73. The supporting ring 95 is welded to the inner cylinder 73 in the welded locations WP1, WP2 set in the vicinity of the two locations which are perpendicular to the first plane L1 passing the central axis C1 of the inner cylinder 73 and the central axis C2 of the catalysts 90 and in which the second plane L2 passing the central axis C1 of the inner cylinder 73 crosses the inner cylinder 73.

Therefore, the locations WP1, WP2 in which the supporting ring 95 is welded to the inner cylinder 73 are set off the catalysts 90, the welded parts of the supporting ring 95 to the inner cylinder 73 are possibly prevented from suffering a thermal effect from the catalysts 90, and the thermic strain by the thermic deformation of the inner cylinder 73 can be inhibited.

As the supporting ring 95 is welded to the outer cylinder 70 in the two welded locations WP3, WP4 which avoid the welded locations WP1, WP2 of the supporting ring 95 to the inner cylinder 73 in the circumferential direction of the outer cylinder 70 and which are substantially symmetrical based upon the central axis C1 of the inner cylinder 73, the welded parts of the supporting ring 95 to the inner cylinder 73 and the welded parts of the supporting ring 95 to the outer cylinder 70 are mutually not overlapped in a circumferential direction of the exhaust muffler 33, the locations in which thermic strain is caused are dispersed in the supporting ring 95, and an effect of the thermic strain upon the whole supporting ring 95 can be inhibited.

In addition, as the inner cylinder 73 and the outer cylinder 70 both have the elliptic cross section, the catalysts 90 are arranged with them biased in the direction of the long diameter from the central axis C1 of the inner cylinder 73 and the second plane L2 is set so that it passes the central axis C1 of the inner cylinder 73 in the direction of the short diameter. The supporting ring 95 is welded to the part which is located in the position in which the thermal effect from the catalysts 90 is substantially prevented and the curvature of which is large in the outer cylinder 70 and weldability can be enhanced.

As at least one of the two welded locations WP3, WP4 of the supporting ring 95 to the outer cylinder 70 (the welded location WP4 in this embodiment) is covered with the muffler cover 96 that covers the exhaust muffler 33 from the outside, marks of welding that emerge on the outside surface of the exhaust muffler 33 are covered with the muffler cover 96 and appearance quality can be enhanced.

Further, as the two inner cylinder configuring members 74, 75 which can be split at the split faces along the central axis C1 of the inner cylinder 73 are welded and connected to form the uplifted parts 73a, 73b uplifted from the outside face of the inner cylinder 73 on the inner cylinder 73 and the two recessed portions 98 corresponding to the uplifted parts 73a, 73b arranged in the two locations at an interval in the circumferential direction of the inner cylinder 73 are formed on the inside face of the supporting ring 95, the uplifted parts 73a, 73b uplifted from the outside face of the inner cylinder 73 can be prevented from interfering with the supporting ring 95 when the inner cylinder 73 is inserted inside the supporting ring 95 and is attached.

Furthermore, the catalysts 90 is housed in the exhaust muffler 33 arranged outside the swing arm 34, the bracket 35 for the cushion and the bracket 36 for the muffler are not overlapped in the side view, and the caliper 41 supported by the swing arm 34 and the catalysts 90 are not overlapped in the side view. The transmission of heat caused in the catalysts 90 to the bracket 35 for the cushion, the bracket 36 for the muffler and the side of the caliper 41 can be inhibited, and a thermal effect upon the rear cushion unit 24 and the caliper 41 can be minimized.

Figure 12:
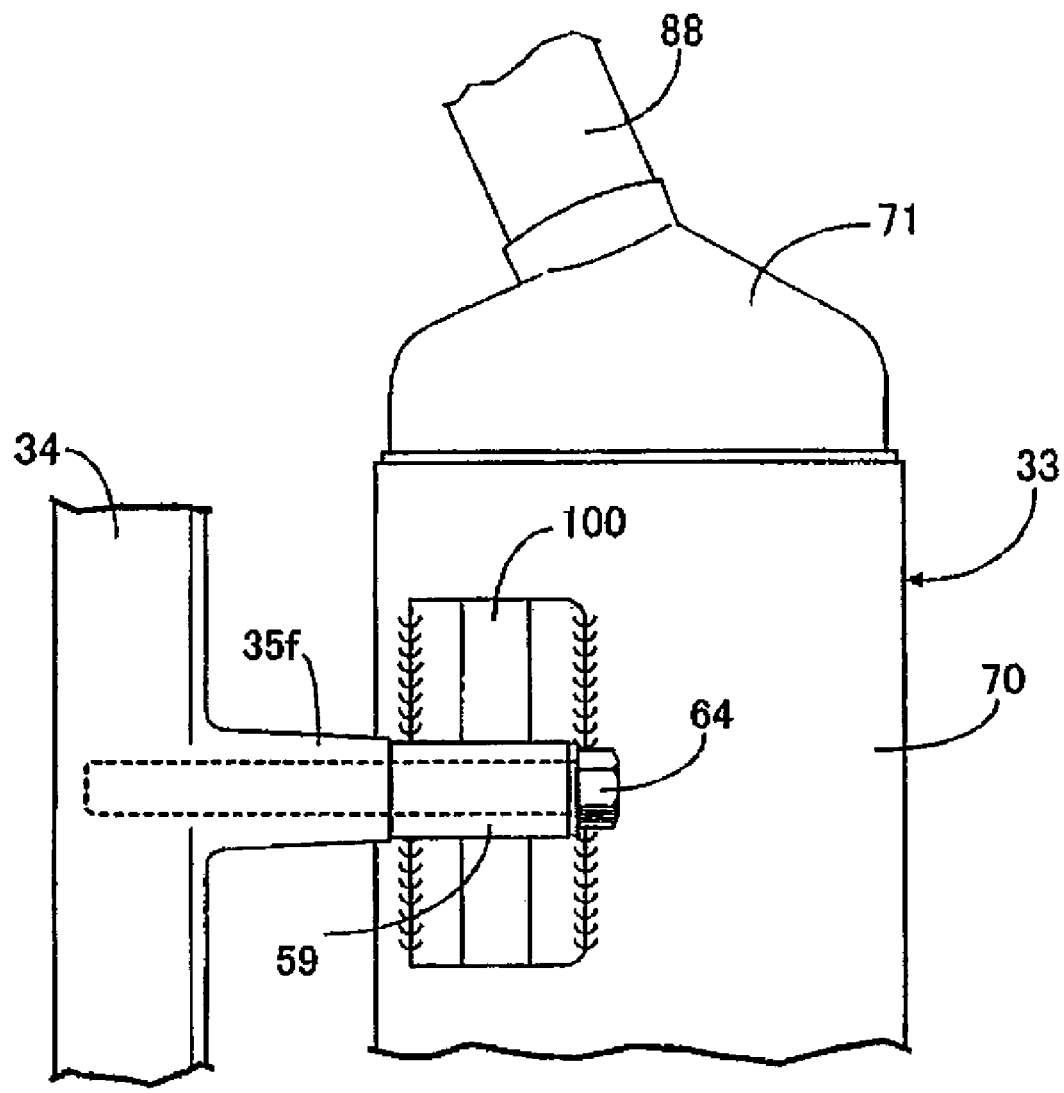
FIG. 12 shows a second embodiment corresponding to FIG. 6.

In the first embodiment, to support the exhaust muffler 33 by the swing arm 34 and the bracket 36 for the muffler, the stays 58, 60, 62 acquired by press molding a metal plate are welded to the outside face of the outer cylinder 70 of the exhaust muffler 33. However, as in a second embodiment shown in FIG. 12, a stay 100 acquired by forging may be also welded to the outside face of the outer cylinder 70.

Figure 13:
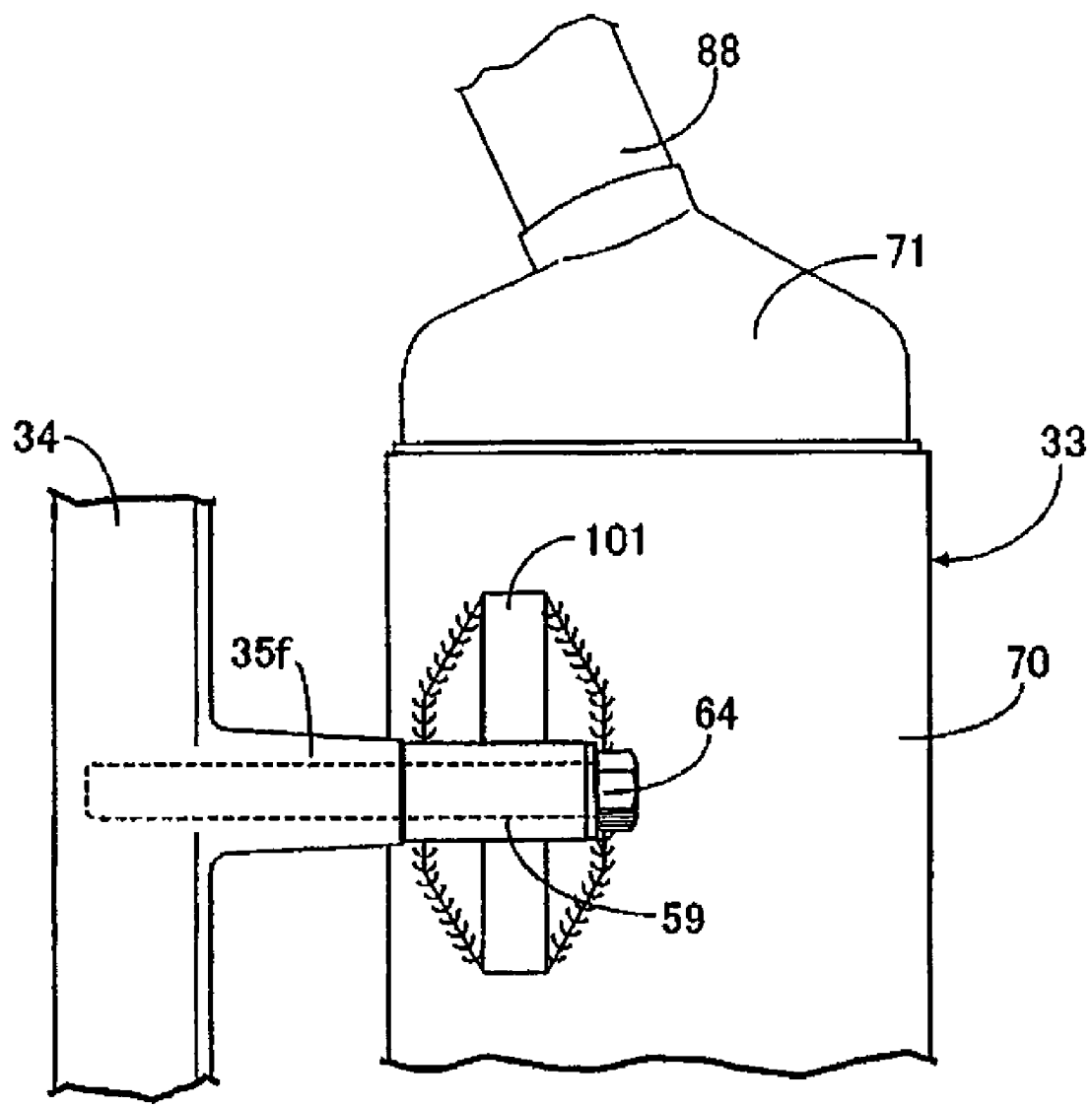
FIG. 13 shows a second embodiment corresponding to FIG. 6.

Besides, as shown in FIG. 13, a stay 101 which is acquired by forging and four corners of which are chamfered may be also welded to the outside face of the outer cylinder 70. According to this third embodiment, the reduction of stress concentration and lightening can be acquired.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A compact vehicle in which a power unit provided with an internal combustion engine for driving a rear wheel is rockably supported by a body frame, both ends of an axle of the rear wheel are journalled by a rear of the power unit and a swing arm fastened to the power unit with the rear wheel held between the swing arm and the rear of the power unit, an exhaust muffler of the internal combustion engine is arranged on a side of the swing arm for the rear wheel, and a rear cushion unit is provided between the body frame and the swing arm,
    wherein a cushion bracket coupled to a lower end of the rear cushion unit and a muffler bracket that supports the exhaust muffler are separate pieces from the swing arm, and attached to the swing arm,
    wherein at least one fastener passes through and fastens the muffler bracket, the cushion bracket and the swing arm together, and
    wherein the muffler bracket is separate from the muffler.

2. The compact vehicle according to claim 1, wherein the cushion bracket and the muffler bracket are fastened to the swing arm at a plurality of locations in a vertical direction.

3. The compact vehicle according to claim 1, wherein the cushion bracket and the muffler bracket are arranged so that the muffler bracket is overlapped with the cushion bracket in a lateral side view of the compact vehicle.

4. The compact vehicle according to claim 3, wherein a maintenance opening is provided to the muffler bracket in order to pass a fastening member for fastening the lower end of the rear cushion unit to the cushion bracket and to pass a tool for operating the fastening member.

5. The compact vehicle according to any of claim 1, wherein a front of the muffler bracket is fastened to the swing arm at at least three locations, and wherein a hole is provided to the muffler bracket in an area encircled by the at least three locations.

6. The compact vehicle according to claim 1, wherein a catalyst is housed in the exhaust muffler arranged outside the swing arm except for a position in which the catalyst is overlapped with the cushion bracket and the muffler bracket in a lateral side view of the compact vehicle.

7. The compact vehicle according to claim 6, wherein a caliper of a disc brake installed on the rear wheel is supported by the swing arm, and wherein the catalyst is housed in the exhaust muffler except for a position in which the catalyst is overlapped with the caliper in a lateral side view of the compact vehicle.

8. The compact vehicle according to claim 1, the at least one fastener includes a pair of fasteners, one of the pair of fasteners is located above the bottom of the rear cushion unit, and the other one of the pair of fasteners is located below the bottom of the rear cushion unit.

9. A compact vehicle comprising:
    a body frame;
    a power unit including an internal combustion engine for driving a rear wheel;
    a swing arm fastened to the power unit, the rear wheel being held between the swing arm and a rear of the power unit;
    a cushion bracket coupled to a lower end of a rear cushion unit located between the body frame and the swing arm; and
    a muffler bracket supporting an exhaust muffler of the internal combustion engine,
    wherein the cushion bracket and the muffler bracket are separate pieces from the swing arm, and are attached to the swing arm,
    wherein at least one fastener passes through and fastens the muffler bracket, the cushion bracket and the swing arm together, and
    wherein the muffler bracket is separate from the muffler.

10. The compact vehicle according to claim 9, wherein the cushion bracket and the muffler bracket are fastened to the swing arm at a plurality of locations in a vertical direction.

11. The compact vehicle according to claim 9, wherein the cushion bracket and the muffler bracket are arranged so that the muffler bracket is overlapped with the cushion bracket in a lateral side view of the compact vehicle.

12. The compact vehicle according to claim 11, wherein a maintenance opening is provided to the muffler bracket in order to pass a fastening member for fastening the lower end of the rear cushion unit to the cushion bracket and to pass a tool for operating the fastening member.

13. The compact vehicle according to claim 9, wherein a front of the muffler bracket is fastened to the swing arm at at least three locations, and wherein a hole is provided to the muffler bracket in an area encircled by the at least three locations.

14. The compact vehicle according to claim 9, wherein a catalyst is housed in the exhaust muffler arranged outside the swing arm except for a position in which the catalyst is overlapped with the cushion bracket and the muffler bracket in a lateral side view of the compact vehicle.

15. The compact vehicle according to claim 14, wherein a caliper of a disc brake installed on the rear wheel is supported by the swing arm, and wherein the catalyst is housed in the exhaust muffler except for a position in which the catalyst is overlapped with the caliper in a lateral side view of the compact vehicle.

16. The compact vehicle according to claim 9, the at least one fastener includes a pair of fasteners, one of the pair of fasteners is located above the bottom of the rear cushion unit, and the other one of the pair of fasteners is located below the bottom of the rear cushion unit.

* * * * *